United States Patent
Hong et al.

(10) Patent No.: US 8,654,273 B2
(45) Date of Patent: Feb. 18, 2014

(54) LIQUID CRYSTAL DISPLAY WITH PRINTED CIRCUIT BOARD ON SIDEWALL OF FRAME

(75) Inventors: Won-Kee Hong, Gunpo-si (KR); Woo-Jung Lee, Yongin-si (KR); Chang-Hwan Kim, Seoul (KR)

(73) Assignee: Samsung Display Co., Ltd. (KR)

( * ) Notice: Subject to any disclaimer, the term of this patent is extended or adjusted under 35 U.S.C. 154(b) by 308 days.

(21) Appl. No.: 13/094,647

(22) Filed: Apr. 26, 2011

(65) Prior Publication Data

US 2011/0261284 A1   Oct. 27, 2011

(30) Foreign Application Priority Data

Apr. 27, 2010   (KR) .................. 10-2010-0039069

(51) Int. Cl.
   *G02F 1/1333*   (2006.01)
(52) U.S. Cl.
   USPC ............. 349/58; 349/149; 349/150; 349/151; 349/152
(58) Field of Classification Search
   USPC ............................ 349/149–152, 58
   See application file for complete search history.

(56) References Cited

U.S. PATENT DOCUMENTS

| | | | |
|---|---|---|---|
| 7,578,610 B2 * | 8/2009 | Sakamoto et al. | 362/634 |
| 2004/0257515 A1 * | 12/2004 | Lee | 349/150 |
| 2009/0009682 A1 * | 1/2009 | Chung et al. | 349/58 |

FOREIGN PATENT DOCUMENTS

| | | |
|---|---|---|
| JP | 2008-116495 | 5/2008 |
| KR | 10-0667071 | 1/2007 |
| KR | 10-2009-0046509 | 5/2009 |

* cited by examiner

*Primary Examiner* — Phu Vu
(74) *Attorney, Agent, or Firm* — Innovation Counsel LLP

(57) ABSTRACT

A liquid crystal display with an integrated mounting portion for receiving a printed circuit board is presented. A liquid crystal panel has a first surface on which an image is displayed and a second surface opposite the first surface, a printed circuit board is connected to the liquid crystal panel and has a front surface and a rear surface, and an intermediate receiving container includes a frame and a printed circuit board mounting portion positioned on a sidewall of the frame. The printed circuit board is mounted on the printed circuit board mounting portion such that the front plane of the printed circuit board and the first plane of the liquid crystal panel face the same side.

23 Claims, 14 Drawing Sheets

LIQUID CRYSTAL DISPLAY WITH PRINTED CIRCUIT BOARD ON SIDEWALL OF FRAME

CROSS-REFERENCE TO RELATED APPLICATION

This application claims priority from Korean Patent Application No. 10-2010-0039069 filed on Apr. 27, 2010 in the Korean Intellectual Property Office, the disclosure of which is incorporated herein by reference in its entirety.

BACKGROUND OF THE INVENTION

1. Field of the Invention

The present invention relates to a liquid crystal display ("LCD") including an intermediate receiving container capable of mounting a circuit board.

2. Description of the Related Art

LCDs are one of the most widely used flat panel displays ("FPDs"). A conventional LCD includes a liquid crystal panel assembly, which has two panels having a plurality of electrodes formed thereon and a liquid crystal layer interposed between the two panels, and adjusts the amount of light transmitted through the liquid crystal layer by applying voltages to the electrodes so that liquid crystal molecules in the liquid crystal layer can be rearranged.

Since the LCD is a passive emitting device, a backlight assembly for supplying light that passes through a liquid crystal layer is required. A cold cathode fluorescent lamp (CCFL), an external electrode fluorescent lamp (EEFL), a light emitting diode (LED), or the like, may be generally used as a light source for the backlight assembly.

SUMMARY OF THE INVENTION

The present invention provides a liquid crystal display (LCD) capable of easily fixing a circuit board without increasing a thickness of a module.

The above and other aspects of the present invention will be described with reference to exemplary embodiments.

According to an aspect of the present invention, there is provided a liquid crystal display including a liquid crystal panel having a first surface on which an image is displayed and a second surface opposite the first surface, a printed circuit board connected to the liquid crystal panel and having a front surface and a rear surface, and an intermediate receiving container including a frame and a printed circuit board mounting portion positioned on a sidewall of the frame, wherein the printed circuit board is mounted on the printed circuit board mounting portion such that the front plane of the printed circuit board and the first plane of the liquid crystal panel face the same side.

According to another aspect of the present invention, there is provided a liquid crystal display including a liquid crystal panel having a first surface on which an image is displayed and a second surface opposite the first surface, a printed circuit board connected to the liquid crystal panel and having a front surface and a rear surface, and an intermediate receiving container including a frame and a printed circuit board mounting portion formed on a sidewall of the frame, wherein the printed circuit board is mounted on the printed circuit board mounting portion such that the front plane of the printed circuit board and the first plane of the liquid crystal panel face the same side.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

Figure 1:
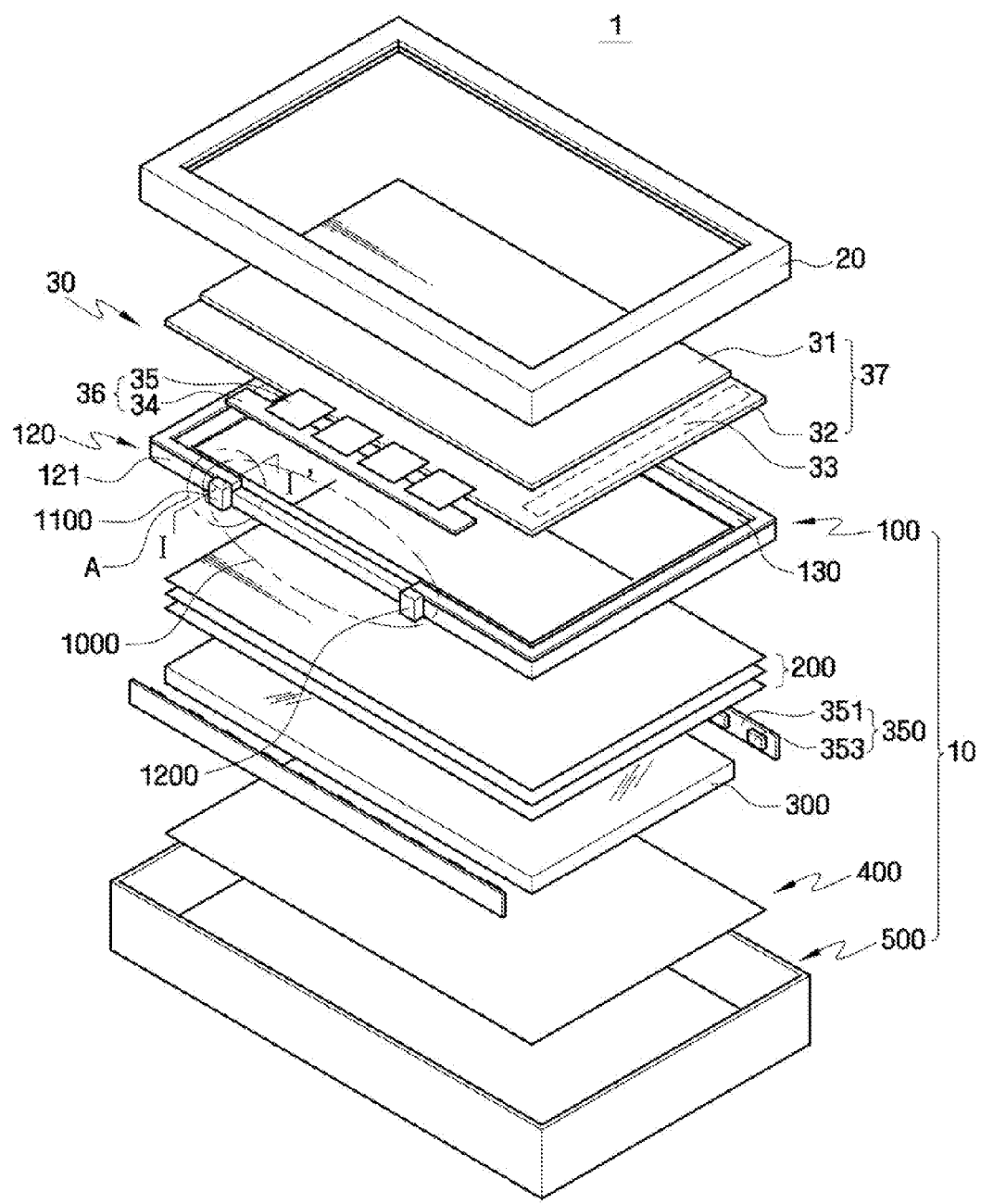
FIG. 1 illustrates an exploded perspective view of an exemplary embodiment of a liquid crystal display (LCD) according to the present invention.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. In the drawings, the thicknesses of layers and regions are exaggerated for clarity.

It will be understood that when an element or layer is referred to as being "on," or "connected to" another element or layer, it can be directly on or connected to the other element or layer or intervening elements or layers may be present. In contrast, when an element is referred to as being "directly on" or "directly connected to" another element or layer, there are no intervening elements or layers present. Like numbers refer to like elements throughout. As used herein, the term "and/or" includes any and all combinations of one or more of the associated listed items.

Spatially relative terms, such as "below," "beneath," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Embodiments described herein will be described referring to plan views and/or cross-sectional views by way of ideal schematic views of the invention. Accordingly, the exemplary views may be modified depending on manufacturing technologies and/or tolerances. Therefore, the embodiments of the invention are not limited to those shown in the views, but include modifications in configuration formed on the basis of manufacturing processes. Therefore, regions exemplified in figures have schematic properties and shapes of regions shown in figures exemplify specific shapes of regions of elements and not limit aspects of the invention.

Figure 2A:
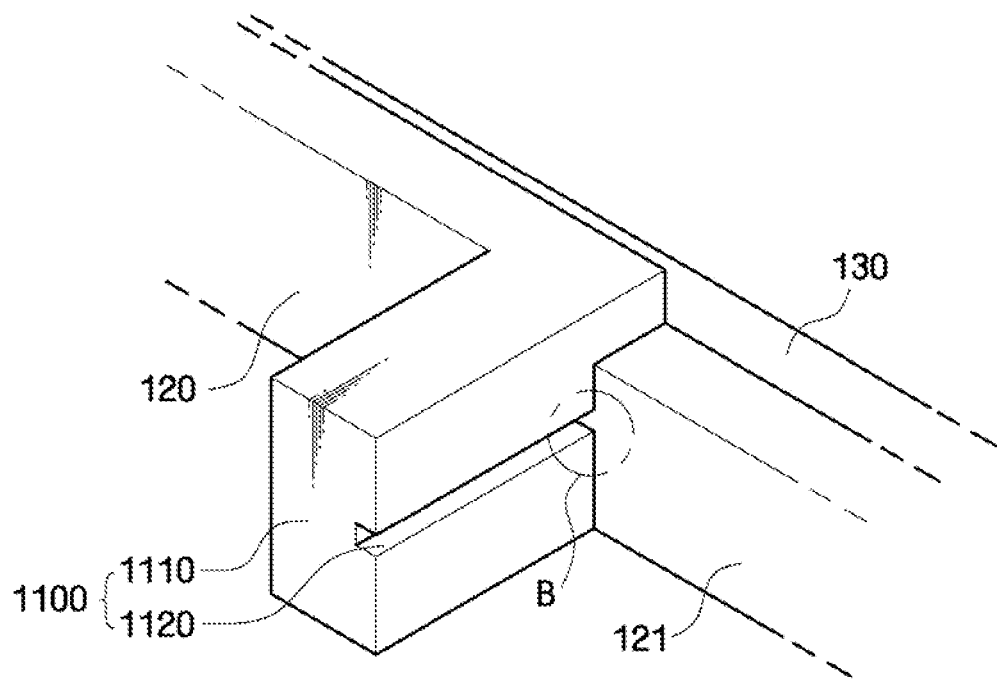
FIG. 2A illustrates an enlarged view of a portion "A" of FIG. 1.
Figure 2B:
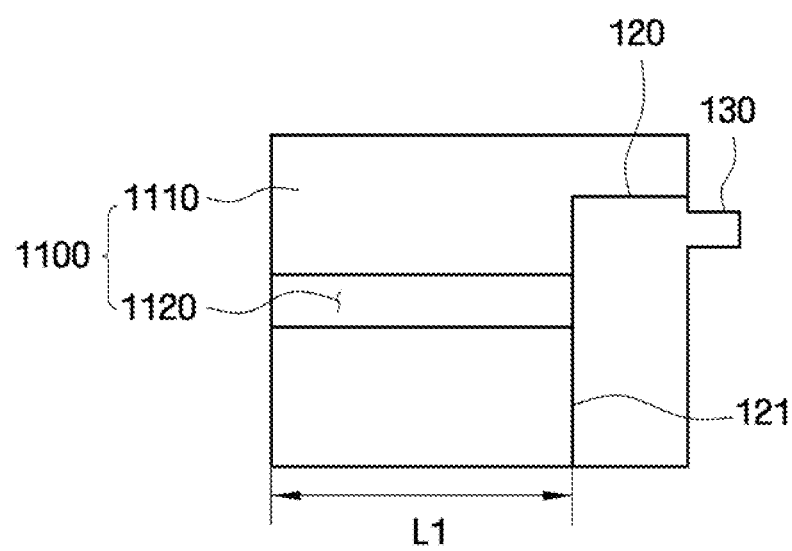
FIG. 2B illustrates a cross-sectional view of FIG. 2A.
Figure 3:
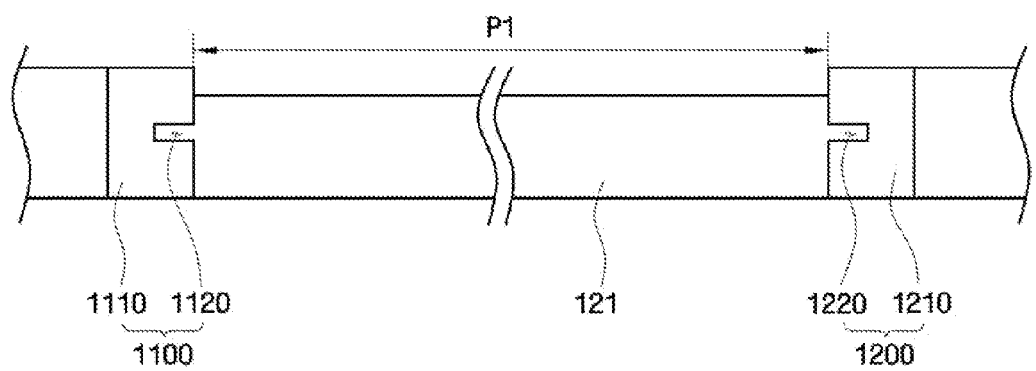
FIG. 3 illustrates a front view of an intermediate receiving container.
Figure 4:
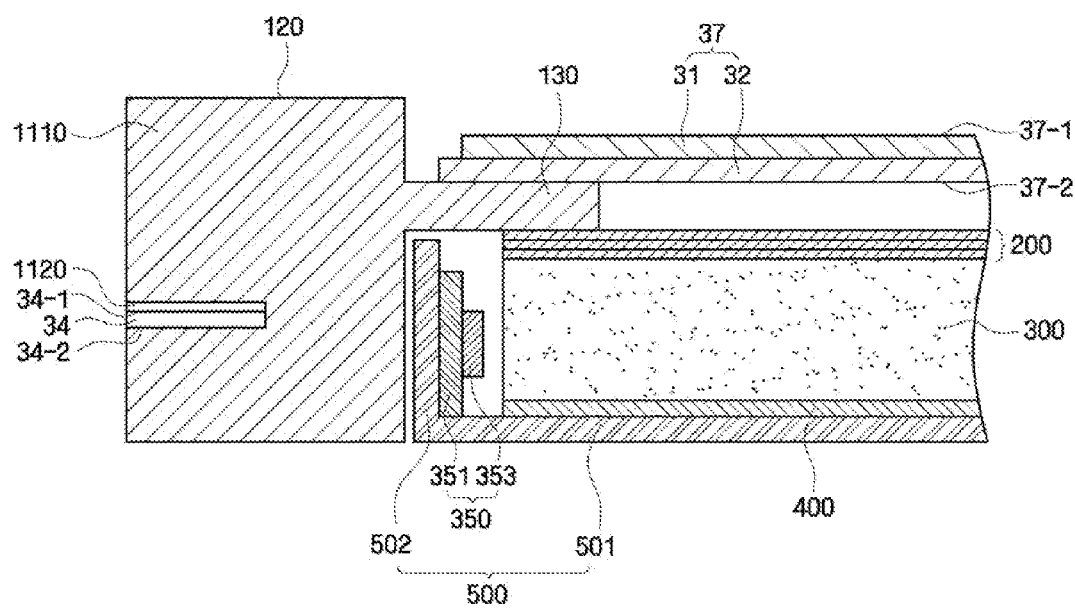
FIG. 4 illustrates a cross-sectional view taken along line I-I' of FIG. 1.
Figure 5A:
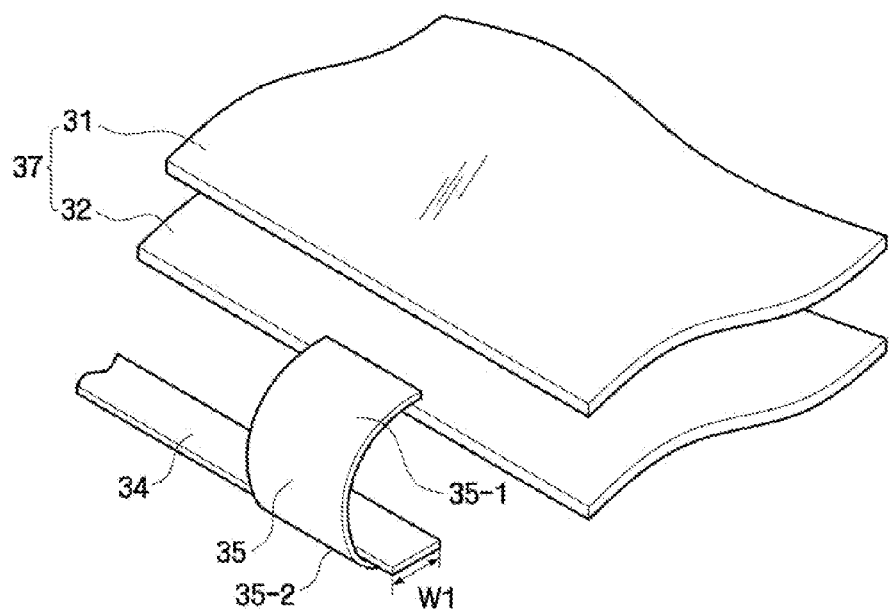
FIGS. 5A and 5B illustrate a connection relationship between a liquid crystal panel and a circuit board.
Figure 5B:
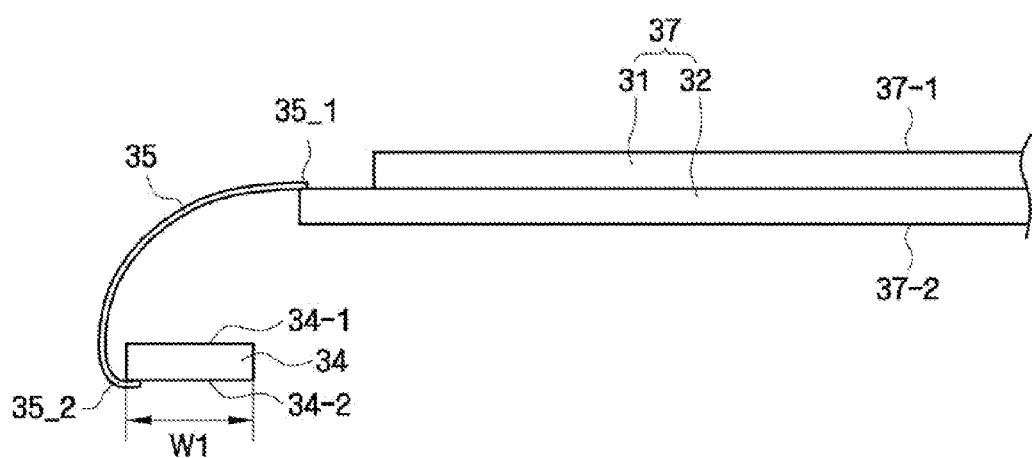
Figure 6A:
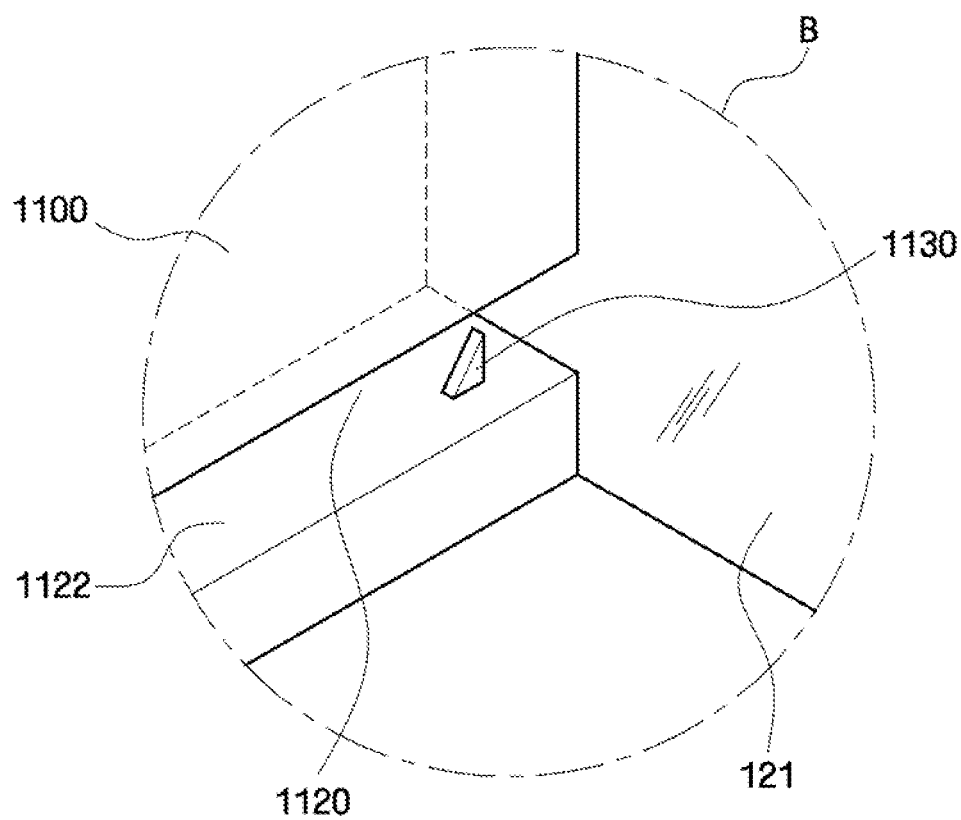
FIG. 6A illustrates an enlarged view of a portion "B" of FIG. 1.
Figure 6B:
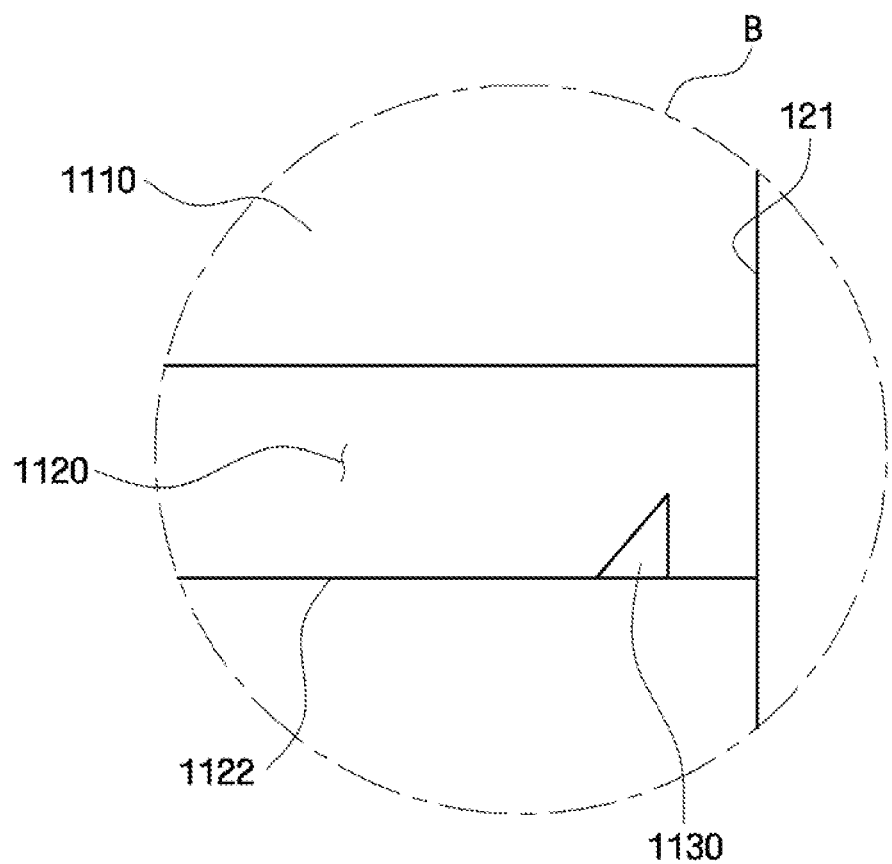
FIG. 6B illustrates a cross-sectional view of FIG. 6A.
Figure 7:
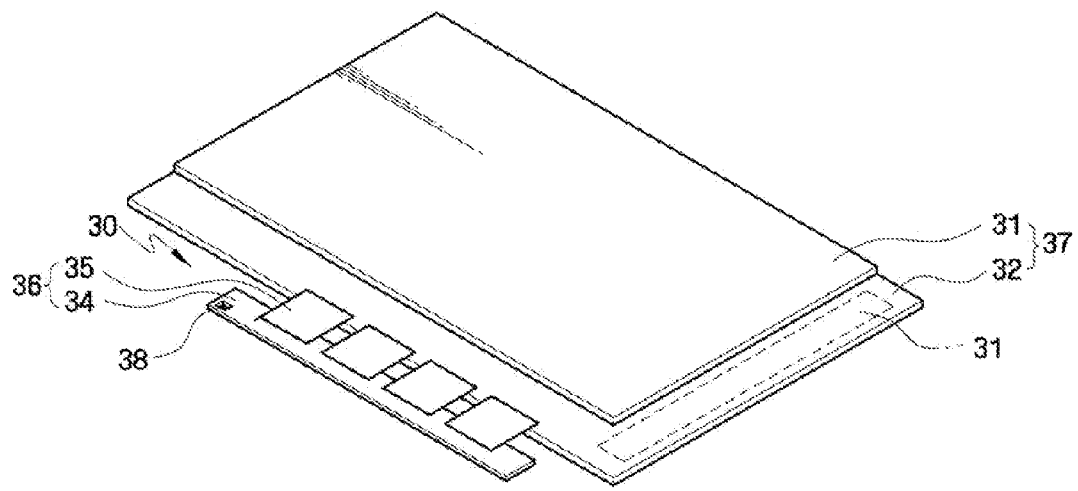
FIG. 7 illustrates a receiving portion of a circuit board.
Figure 8:
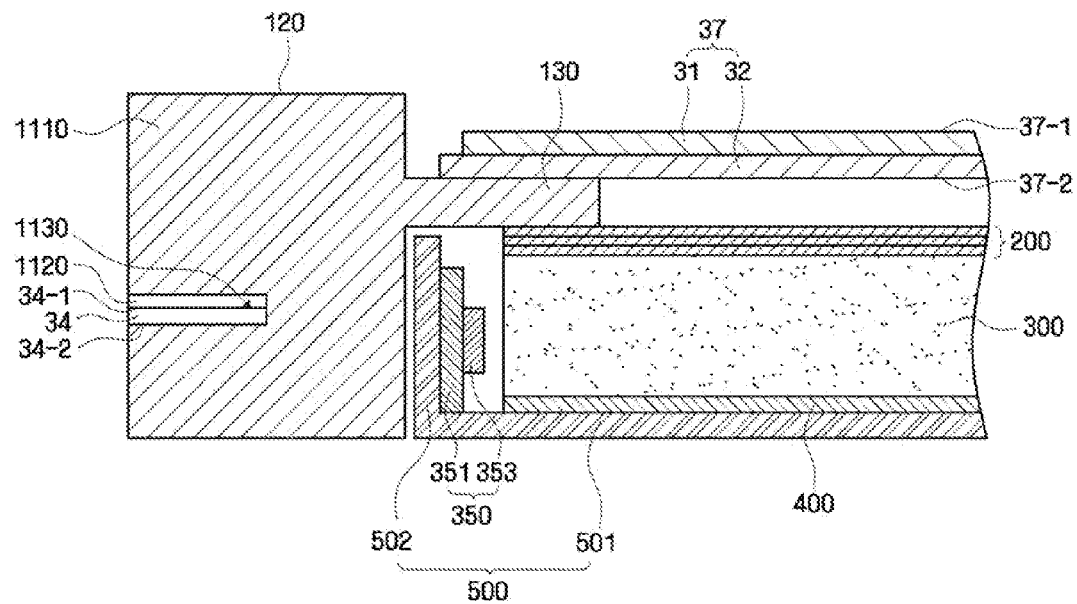
FIG. 8 illustrates a cross-sectional view taken along line I-I' of FIG. 1.

Hereinafter, the present invention will be described in further detail with reference to the accompanying drawings. Hereinafter, exemplary embodiments of the present invention will be described in detail with reference to FIGS. 1 through 19. A liquid crystal display according to an exemplary embodiment of the present invention will first be described in detail with reference to FIGS. 1 through 8. FIG. 1 illustrates an exploded perspective view of an exemplary embodiment of a liquid crystal display (LCD) according to the present invention, FIG. 2A illustrates an enlarged view of an "A" portion of FIG. 1, FIG. 2B illustrates a cross-sectional view of FIG. 2A, FIG. 3 illustrates a front view of an intermediate receiving container, FIG. 4 illustrates a cross-sectional view taken along the line I-I' of FIG. 1, FIGS. 5A and 5B illustrate a connection relationship between a liquid crystal panel and a circuit board, FIG. 6A illustrates an enlarged view of a "B" portion of FIG. 1, FIG. 6B illustrates a cross-sectional view of FIG. 6A, FIG. 7 illustrates a receiving portion of a circuit board, and FIG. 8 illustrates a cross-sectional view taken along the line I-I' of FIG. 1.

The liquid crystal panel 37 includes the first substrate 32 including, for example, a gate line (not shown), a data line (not shown), and a pixel electrode, the second substrate 31 including, for example, a black matrix, color filters, and a common electrode and disposed to face the first substrate 32, a polarizer plate (not shown) disposed under the first substrate 32, and a polarizer plate (not shown) disposed above the second substrate 31. The color filter or the common electrode may be disposed on the first substrate 32 instead of being disposed on the second substrate 31, depending on the type of the liquid crystal panel 37. When an electrical signal is transmitted to the liquid crystal panel 37, an image is displayed on the liquid crystal panel 37. In the following description, for brevity of explanation, it will be assumed that a surface of the liquid crystal panel 37 on which an image is displayed is a first surface 37-1 and a surface of the liquid crystal panel 37 that is opposite the first surface 37-1 is a second surface 37-2.

The liquid crystal panel 37 includes the plate-shaped panels stacked therein and resting on the intermediate receiving container 100.

A gate driver IC 33 is integrated onto the first substrate 32 and connected to each gate line (not shown), and the flexible circuit board 35 is connected to each data line on the first substrate 32. In alternative embodiments, the gate driver IC 33 may be disposed on a flexible circuit board (not shown) connected to the first substrate 32 or to a separate printed circuit board (not shown) connected to the first substrate 32 through the flexible circuit board.

Various driving elements which apply a gate-driving signal to the gate driver IC 33, apply a data driving signal to the flexible printed circuit board 35 or process the gate-driving signal and the data driving signal may be mounted on the printed circuit board 34. In the following description, for brevity of explanation, it is assumed that a surface of the printed circuit board 34 that is on the same side of the printed circuit board 34 as the first surface 37-1 is of the liquid crystal panel 37 is a front surface 34-1, and a surface of the printed circuit board 34 that is opposite the front surface 34-1 is a rear surface 34-2.

The backlight assembly 10 includes a light guide plate (LGP) 300, a reflective sheet 400, optical sheets 200, a lower receiving container 500, an intermediate receiving container 100, a light source 353, and a flexible printed circuit board 351 for driving a light source. The LGP 300 may be made of a material with light-transmitting properties in order to efficiently guide light. In one exemplary embodiment, the LGP 300 may be made of acrylic resin such as polymethylmethacrylate (PMMA) or a material with a fixed refractive index, such as polycarbonate (PC).

Light which is incident on a side of the LGP 300 made of the above material has an angle of incidence that does not exceed a critical angle of the LGP 300. Thus, the light is delivered into the LGP 300. When light is incident on a top surface or a bottom surface of the LGP 300, it has an angle that exceeds the critical angle of the LGP 300, and does not enter the LGP 300. Thus, the light incident upon a side of the LGP 300 is uniformly transmitted within the LGP 300. In order to allow guided light to be directed upward, a diffusion pattern (not shown) may be formed on any one of the top surface and the bottom surface of the LGP 300.

When the diffusion pattern is formed on, for example, the bottom surface of the LGP 300, guided light may be output upward at an angle smaller than the critical angle.

At least one light source 353 is disposed at either side of the LGP 300 to emit light.

In the present embodiment, in order to achieve the desired slimness of an LCD, a point light source, such as an LED, may be used as the light source 353. However, the present invention does not exclude the use of a line light source, such as cold cathode fluorescent lamp (CCFL), an external electrode fluorescent lamp (EEFL), or the like. In the following description, however, for convenience, assume that the light source 353 is a point light source.

The light source 353 may be disposed at one side on the light source driving flexible printed circuit board 351. The flexible printed circuit board 351 may be electrically connected to an inverter (not shown) for supplying power to be supplied with power.

The reflective sheet 400 is disposed below the LGP 300 to upwardly reflect light emitted downward with respect to the LGP 300.

The reflective sheet 400 may be made of a reflective material, such as polyethylene terephthalate (PET), and may have one surface coated with a diffusion layer containing, for example, titanium dioxide.

The LGP 300, the light source 353 and the reflective sheet 400 are received in the lower receiving container 500.

One or more optical sheets 200 are disposed on the LGP 300 to diffuse and focus the light delivered from the LGP 300. The optical sheets 200 may include a diffusive sheet, a prism sheet, and a protective sheet. The diffusive sheet may be positioned between the LGP 300 and the prism sheet to disperse the light incident from the LGP 300, thereby preventing the light from partially concentrating. The prism sheet may be formed such that trigonal prisms are formed in a predetermined arrangement on one surface of the prism sheet. The prism sheet may focus the diffused light emitted from the diffusive sheet in a direction perpendicular to the liquid crystal panel 37. The protective sheet may be disposed on the prism sheet to protect a surface of the prism sheet or to enhance luminance uniformity of the light passing therethrough.

The upper receiving container 20 includes a window at its center, the window exposing the liquid crystal panel 37. The upper receiving container 20 and the lower receiving container 500 are coupled to each other, and the intermediate receiving container 100 is interposed therebetween.

The upper receiving container 20 and the lower receiving container 500 may be made of a metal having some rigidity, such as stainless steel.

Referring to FIGS. 1 through 3, the intermediate receiving container 100 according to an exemplary embodiment of the present invention includes a frame 120 and a printed circuit board mounting portion 1000 positioned on an exterior surface of one of sidewalls 121 of the frame 120.

The frame 120 may be a frame including an opening. For example, the frame 120 may have a rectangular shape with four sidewalls. Here, the frame 120 may include a panel resting portion 130, which is a ledge inwardly protruding from the sidewalls. The liquid crystal panel 37 rests on the panel resting portion 130. Specifically, the liquid crystal panel 37 rests on the top surface of the panel resting portion 130 and the optical sheets 200 contact the bottom surface of the liquid crystal panel 37, thereby preventing the optical sheets 200 from sliding or moving in the lower receiving container 500.

The printed circuit board mounting portion 1000 is positioned on an exterior surface of one sidewall 120 of the frame 120. Here, the printed circuit board mounting portion 1000 includes slide rails 1100 and 1200 into which the printed circuit board 34 is slidably inserted. Referring to FIG. 3, the slide rails 1100 and 1200 may be formed on one sidewall 121 of the frame 120 in pair to be spaced apart from each other by a predetermined distance P1. Accordingly, one side of the printed circuit board 34 and the opposite side thereof are slidably inserted into the slide rails 1100 and 1200, respectively, to then be supported.

Referring to FIGS. 1 through 3, the slide rails 1100 and 1200 include protrusions 1110 and 1120 protruding from one sidewall 121 of the frame 120 to an edge of the liquid crystal panel 37. In addition, the slide rails 1100 and 1200 include grooves 1120 and 1220 which are formed at one side of the respective protrusions 1110 and 1120 and into which the printed circuit board 34 is slidably inserted. The grooves 1120 and 1220 may extend from a sidewall 121 of the frame 120 to distal ends of the protrusions 1110 and 1120. The first and the second ends of the printed circuit board 34 may be slidably inserted into the grooves 1120 and 1220. In other words, the printed circuit board 34 may be mounted on the printed circuit board mounting portion 1000 in a sliding manner without the necessity of being assembled with the intermediate receiving container 100 using a separate fastening member, such as a screw. A length L3 of each of the grooves 1120 and 1220 may be substantially equal to a width ('W1' of FIG. 5A) of the printed circuit board 34. Accordingly, the printed circuit board 34 may be inserted into the grooves 1120 and 1220.

Referring to FIG. 4, when the printed circuit board 34 is slidably mounted on the printed circuit board mounting portion 1000, the printed circuit board 34 may be finally disposed on one side of the outer surface of the liquid crystal panel 37. In addition, the printed circuit board 34 may be mounted on the printed circuit board mounting portion 1000 such that the front surface 34-1 of the printed circuit board 34 and the first surface 37-1 of the liquid crystal panel 37 face the same direction. surface 34-1 or The printed circuit board 34 and the liquid crystal panel 37 may be disposed so as not to overlap each other.

In the present embodiment, the liquid crystal panel assembly 30 may be assembled in the following manner. First, the first and second ends of the printed circuit board 34 are slidably inserted into the grooves 1120 and 1220 of the slide rails 1100 and 1200, respectively, to be disposed at an exterior surface of the sidewall 121 of the frame 120. After the printed circuit board 34 is mounted on the printed circuit board mounting portion 1000, the flexible printed circuit board 35 connecting the printed circuit board 34 and the liquid crystal panel 37 is bent to place the liquid crystal panel 37 on the panel resting portion 130. This way, the liquid crystal panel assembly 30 is received in the intermediate receiving container 100.

Referring to FIGS. 5A and 5B, when the first and second ends of the printed circuit board 34 are mounted on the printed circuit board mounting portion 1000, the liquid crystal panel 37, the flexible printed circuit board 35 and the printed circuit board 34 generally form a U-shaped configuration.

The flexible printed circuit board 35 may have a first end 35-1 and a second end 35-2. In an exemplary embodiment, the first end 35-1 may be connected to the liquid crystal panel 37 and the second end 35-2 may be connected to the printed circuit board 34. Meanwhile, a width W1 of one side of the printed circuit board 34 may be substantially equal to the length L1 of each of the grooves 1120 and 1220.

Referring to FIGS. 6A and 6B, the slide rail 1100 includes a securing portion 1130 formed on a sliding plane 1122 of the groove 1120. The securing portion 1130 may be shaped of a protrusion protruding from the sliding plane 1122 of the groove 1120. The securing portion 1130 is received in a receiving part 38, which will be described below. Accordingly, the printed circuit board 34 is fixed in position after being inserted into the slide rail 1100.

Referring to FIG. 7, the receiving part 38 may be formed at one edge of the printed circuit board 34. The receiving part 38 may be a coupling hole penetrating through the edge of the printed circuit board 34 to be coupled to the securing portion 1130 printed circuit board 34. Alternatively, the securing portion 1130 may be a hook.

Referring to FIG. 8, the printed circuit board 34 slides along the sliding plane 1122 of the groove 1120 and continuously slides along the inclined plane of the securing portion 1130 until the securing portion 1130 is securely inserted into the coupling hole 38.

The intermediate receiving container 100 may be made of a molded material, for example, a plastic material. Therefore, the intermediate receiving container 100 is easily formed even if it has a complex structure. In particular, the protrusions 1110 and 1120 of the slide rails 1100 and 1200 extending from the one sidewall 121 of the frame 120 and the grooves 1120 and 1220 may be easily formed.

As described above, according to the present embodiment, the printed circuit board mounting portion 1000 and the intermediate receiving container 100 for mounting the printed circuit board 34 can be easily formed using a moldable material. In addition, since a space for fixedly mounting the printed circuit board 34 is secured, a separate processing time required for fastening the printed circuit board 34 using separate fastening members, for example, bolts and nuts, can be reduced in the manufacture of an LCD, thereby achieving miniaturization of the printed circuit board 34 and improving the integration density of the printed circuit board 34.

Figure 9:
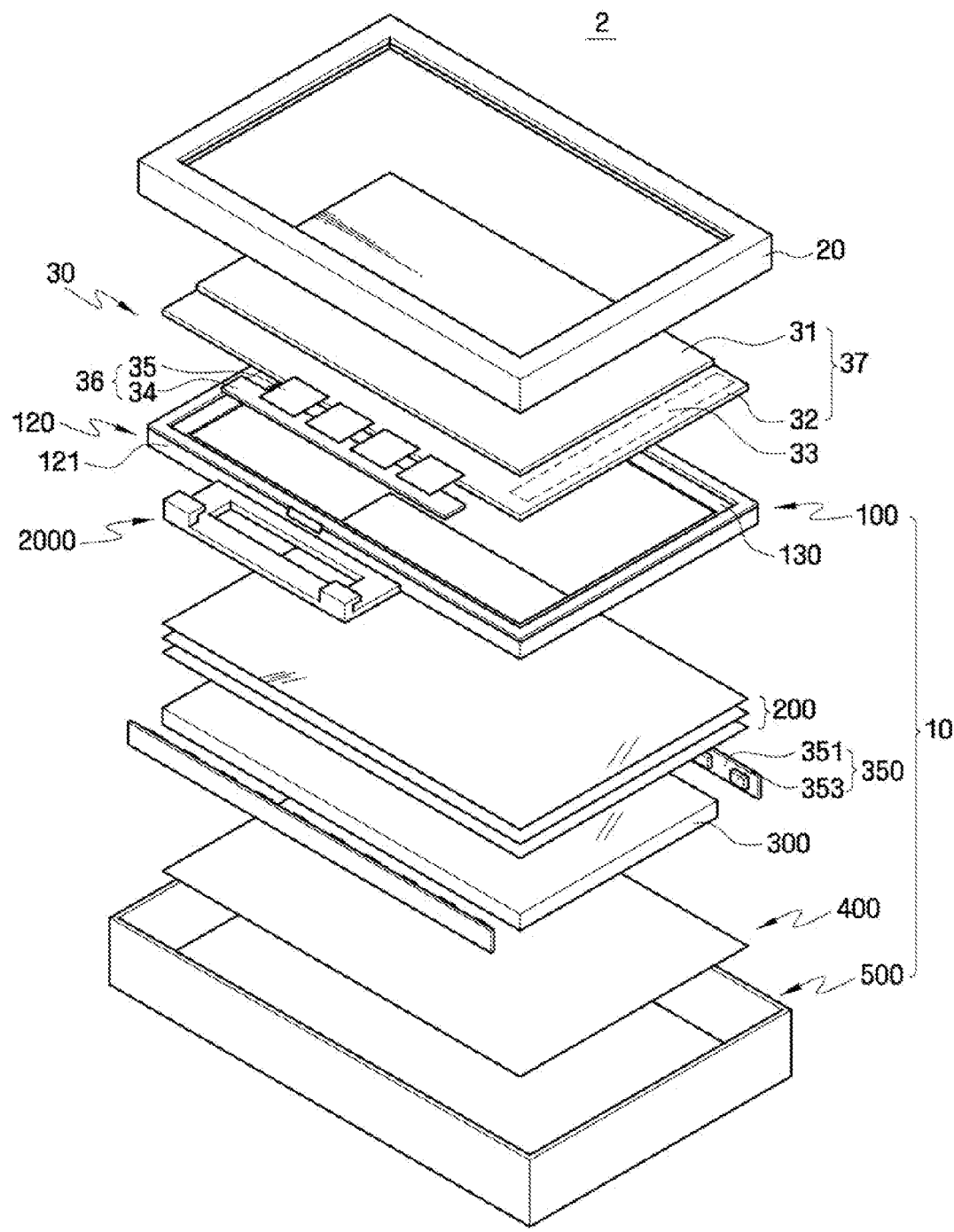
FIG. 9 illustrates an exploded perspective view of another exemplary embodiment of a liquid crystal display (LCD) according to the present invention.
Figure 10:
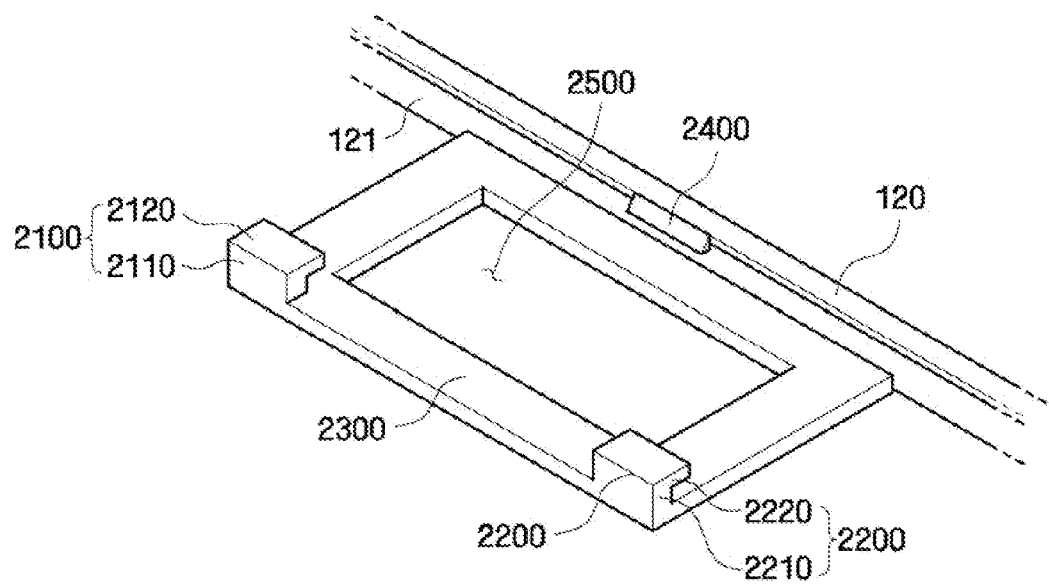
FIG. 10 illustrates a circuit board mounting portion of the LCD shown in FIG. 9.
Figure 11:
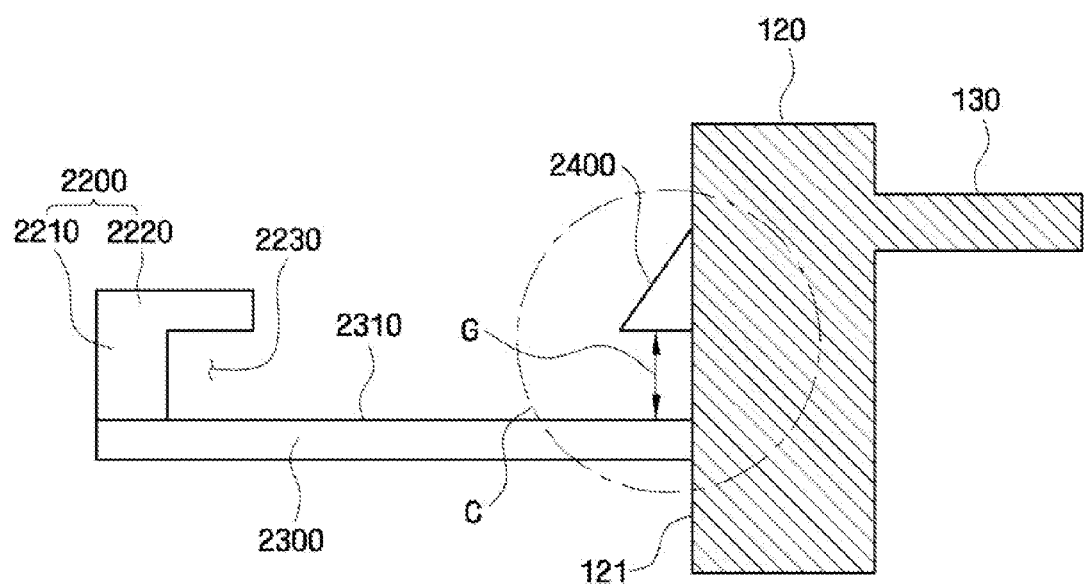
FIG. 11 illustrates a cross-sectional view of the circuit board mounting portion of the LCD shown in FIG. 9.
Figure 12:
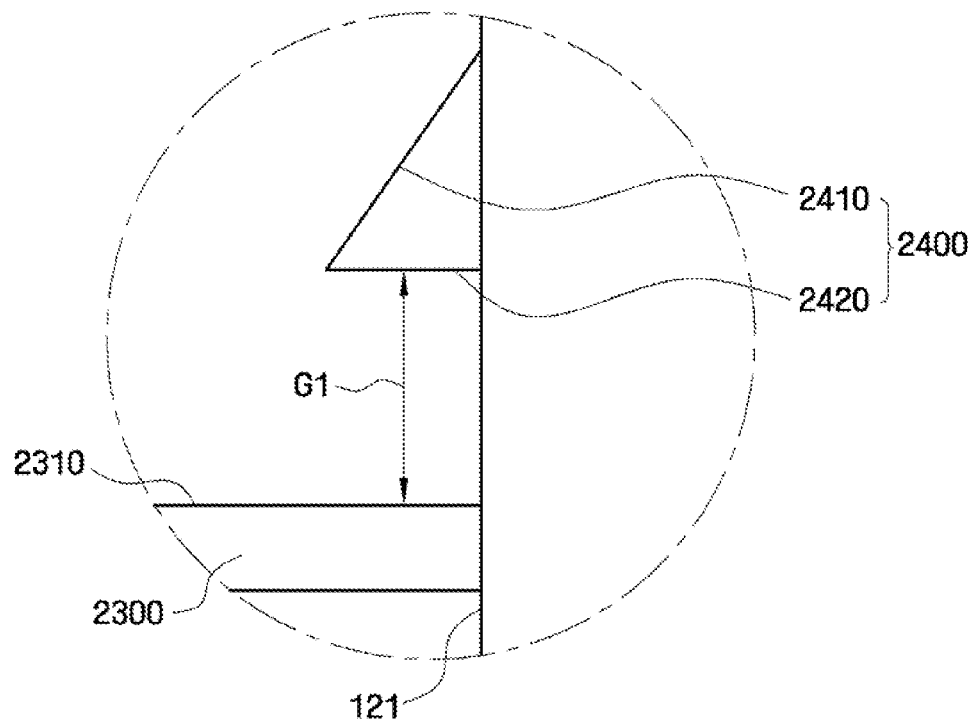
FIG. 12 illustrates an enlarged view of a portion "C" of FIG. 11.
Figure 13:
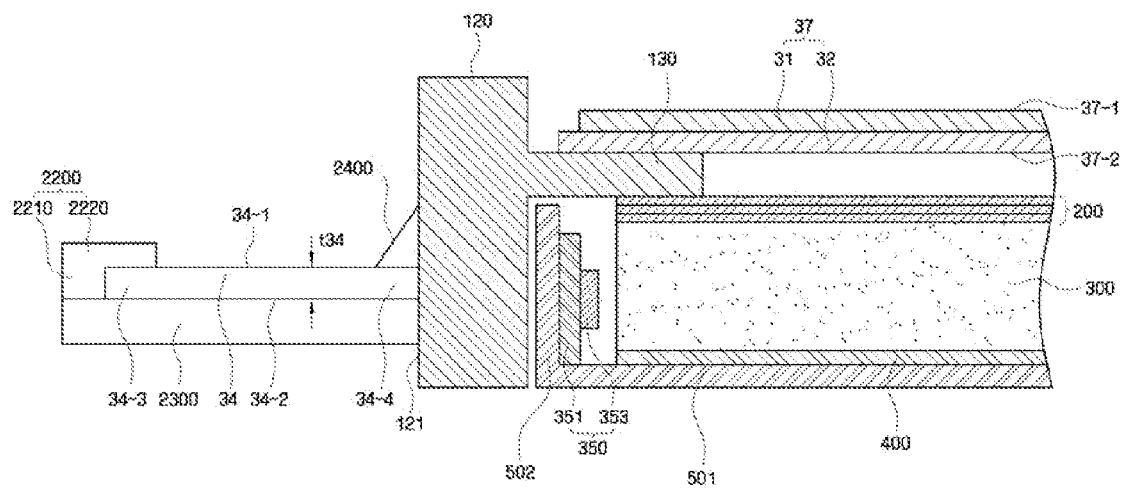
FIG. 13 illustrates a state in which a circuit board is mounted on the circuit board mounting portion of the LCD shown in FIG. 9.

Next, a liquid crystal display according to another exemplary embodiment of the present invention will be described in detail with reference to FIGS. 9 through 13. FIG. 9 illustrates an exploded perspective view of another exemplary embodiment of a liquid crystal display (LCD) according to the present invention, FIG. 10 illustrates a circuit board mounting portion of the LCD shown in FIG. 9, FIG. 11 illustrates a cross-sectional view of the circuit board mounting portion of the LCD shown in FIG. 9, FIG. 12 illustrates an enlarged view of a "C" portion of FIG. 11, and FIG. 13 illustrates a state in which a circuit board is mounted on the circuit board mounting portion of the LCD shown in FIG. 9. For brevity, in the embodiments that follow, components having substantially the same function as the exemplary embodiment shown in FIGS. 1 through 8 are identified by the same reference numerals, and detailed descriptions thereof will be omitted or briefly given.

Referring to FIG. 9, in the LCD 2 according to a second exemplary embodiment of the present invention, an intermediate receiving container 100 includes a frame 120 on which a liquid crystal panel 37 rests, and a printed circuit board mounting portion 2000 positioned at an exterior surface of one of sidewalls 121 of the frame 120.

The printed circuit board mounting portion 2000 includes slide rails 2100 and 2200 into which the printed circuit board 34 is slidably inserted, a printed circuit board support portion 2300, and a stopper 2400.

Referring to FIGS. 10 and 11, slide rails 2100 and 2200 include upright portions 2110 and 2210 protruding from a first surface of a printed circuit board supporting portion 2300, and parallel portions 2120 and 2220 extending from the upright portions 2110 and 2210 in a plane that is parallel to the first surface of the printed circuit board supporting portion 2300. The upright portions 2110 and 2210, the parallel portions 2120 and 2220, and the first surface of the printed circuit board supporting portion 2300 form an insertion groove 2230 into which part of the printed circuit board 34 is slidably inserted.

The printed circuit board supporting portion 2300 supports the printed circuit board 34 inserted into the slide rails 2100 and 2200 to be mounted on the printed circuit board mounting portion 2000. The printed circuit board supporting portion 2300 protrudes from a sidewall 121 of the frame 120. The printed circuit board supporting portion 2300 may be formed to have a substantially similar outline as the printed circuit board 34. For example, if the printed circuit board 34 has a rectangular shape, the printed circuit board supporting portion 2300 may also have a rectangular shape. The printed circuit board supporting portion 2300 may be generally plate-shaped, for example. Meanwhile, the printed circuit board supporting portion 2300 may include an opening 2500 to enhance dissipation of heat generated by the printed circuit board 34.

The stopper 2400 protrudes from the sidewall 121 of the frame 120 and is disposed parallel to the printed circuit board supporting portion 2300. The stopper 2400 fixes the printed circuit board 34 inserted into the slide rails 2100 and 2200 on the printed circuit board mounting portion 2000. The stopper 2400 maybe made of an elastic materially.

Referring to FIGS. 11 and 12, the stopper 2400 may include a slanted surface 2410 that inclines downward with distance from the sidewall 121 of the frame 120, and a bottom portion 2420 that extends substantially perpendicularly to the sidewall 121 between an end of the slanted surface and the sidewall 121 of the frame 120. A gap G1 between the stopper 2400 and the printed circuit board supporting portion 2300 may be substantially equal to or slightly smaller than a thickness ('t34' of FIG. 13) of the printed circuit board 34 to be mounted on the printed circuit board mounting portion 2000.

Referring to FIG. 13, a first end 34-3 of the printed circuit board 34 is first slidably inserted into the slide rails 2100 and 2200. Thereafter, a second end 34-4 of the printed circuit board 34 slides along the oblique side 2410 of the stopper 2400 and is interposed between the bottom portion 2420 of the stopper 2400 and the printed circuit board supporting portion 2300 to be fixed by the stopper 2400. In such a manner, the printed circuit board 34 is mounted on the printed circuit board mounting portion 2000. Here, a rear surface 34-2 of the printed circuit board 34 is settled on one plane of the printed circuit board supporting portion 2300. In addition, a front surface 34-1 of the printed circuit board 34 is disposed to face the same side as a first surface 37-1 of the liquid crystal panel 37.

As described above, according to the current embodiment, the printed circuit board mounting portion 2000 and the intermediate receiving container 100 for mounting the printed circuit board 34 can be easily formed using a molded material. In addition, since a space for fixedly mounting the printed circuit board 34 is separately provided, additional processing time that would be required for fastening the printed circuit board 34 using fastening members such as nuts and bolts can be reduced in the manufacture of an LCD. This way, miniaturization of the printed circuit board 34 and higher integration density of the printed circuit board 34 may be achieved.

Figure 14:
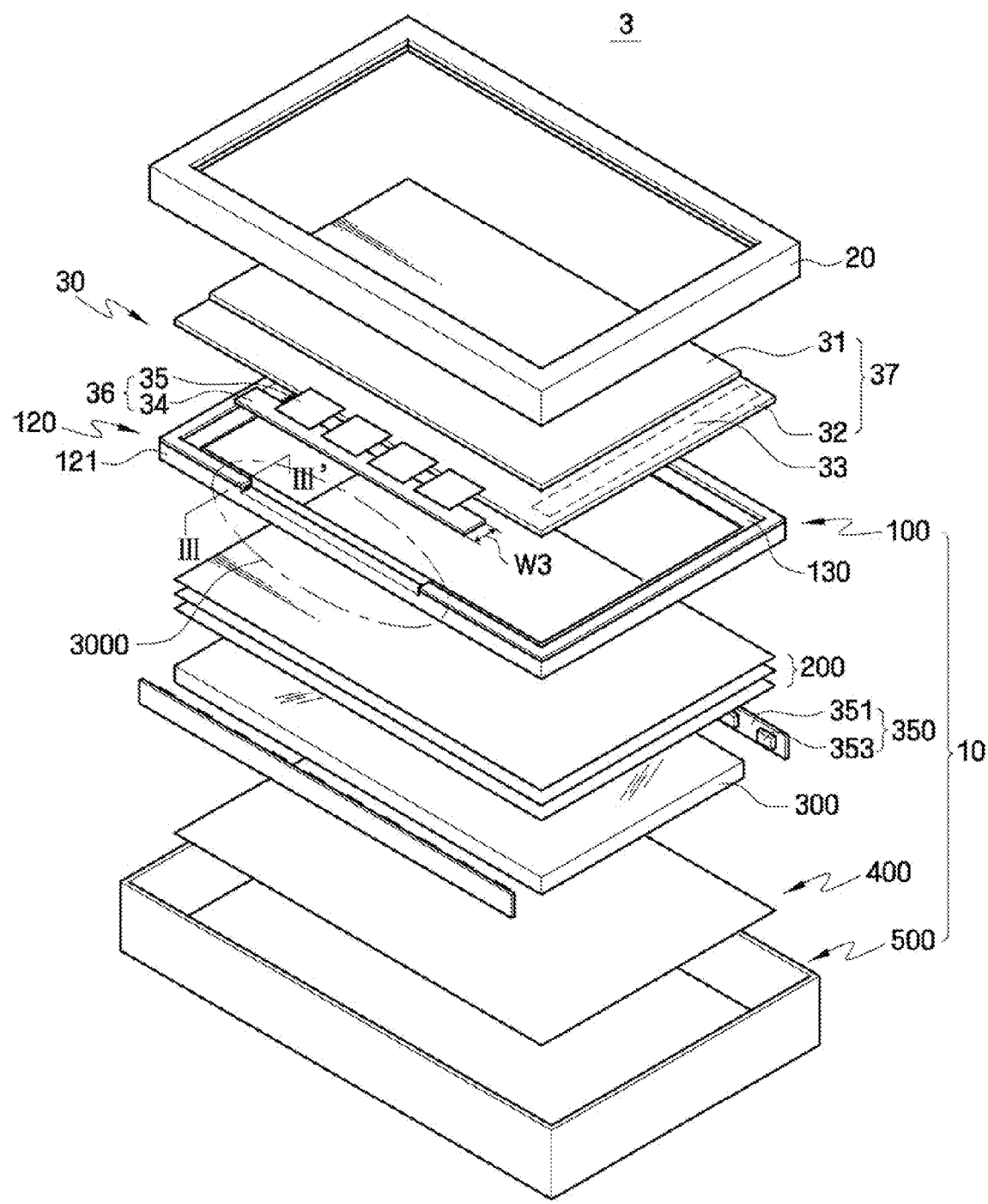
FIG. 14 illustrates an exploded perspective view of still another exemplary embodiment of a liquid crystal display (LCD) according to the present invention.
Figure 15:
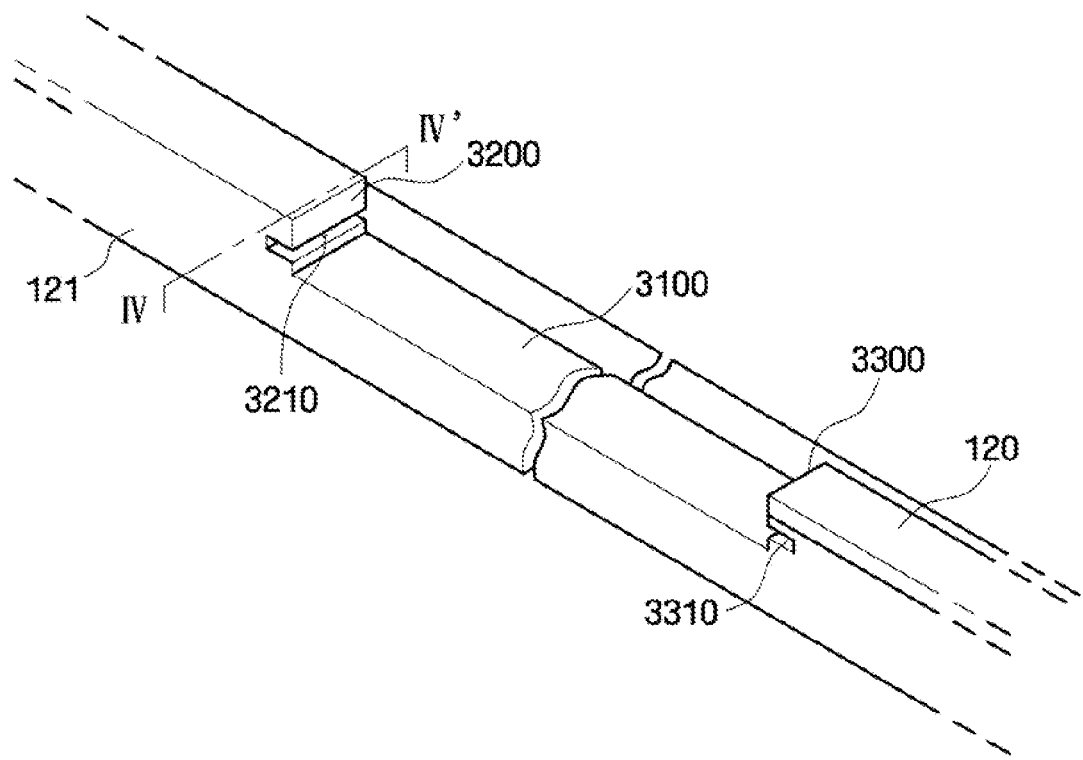
FIG. 15 illustrates a circuit board mounting portion of the LCD shown in FIG. 13.
Figure 16:
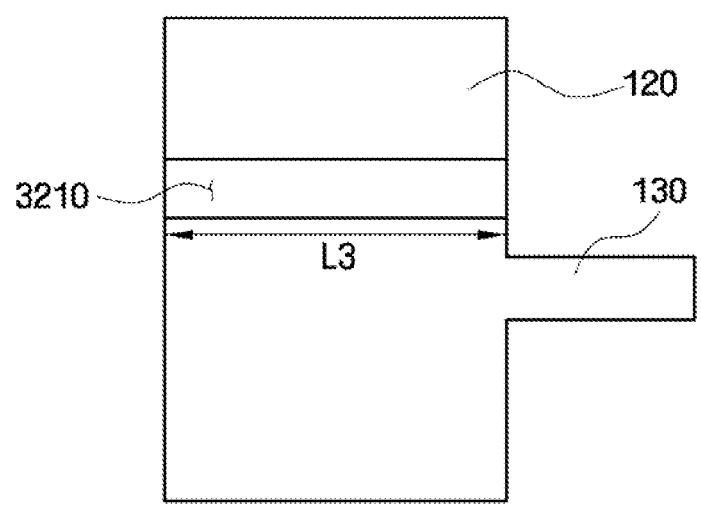
FIG. 16 illustrates a cross-sectional view taken along line IV-IV' of FIG. 15.
Figure 17:
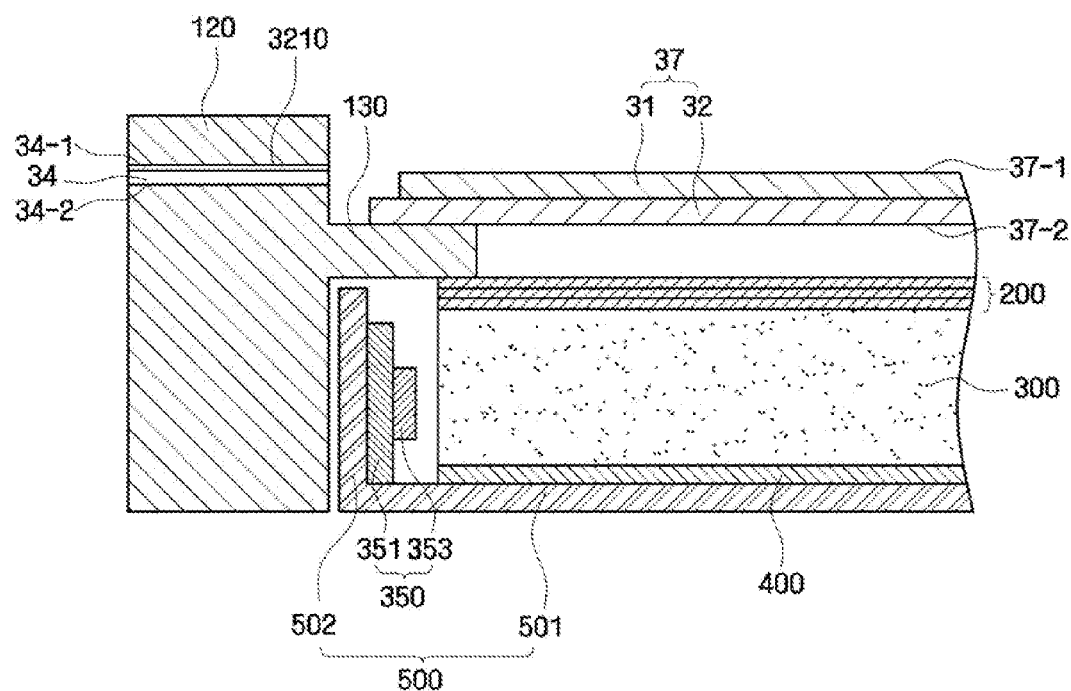
FIG. 17 illustrates a cross-sectional view taken along line III-III' of FIG. 14.
Figure 18:
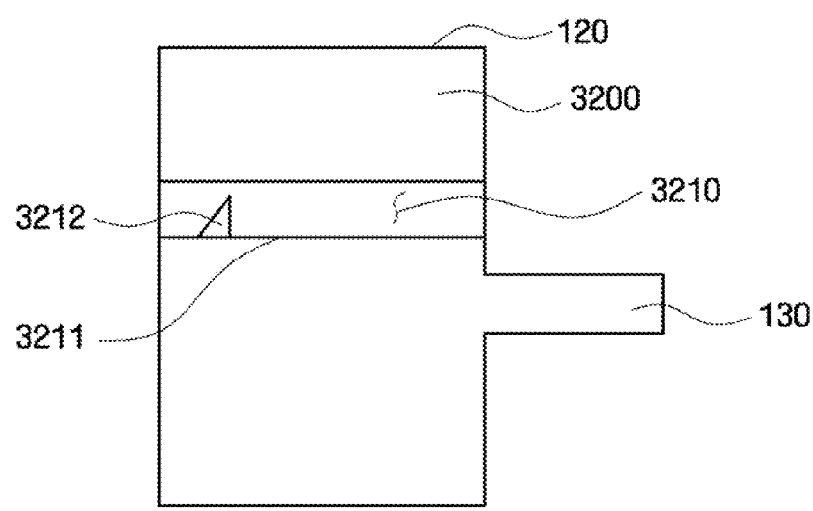
FIG. 18 illustrates a cross-sectional view taken along line IV-IV' of a modified embodiment of FIG. 15.
Figure 19:
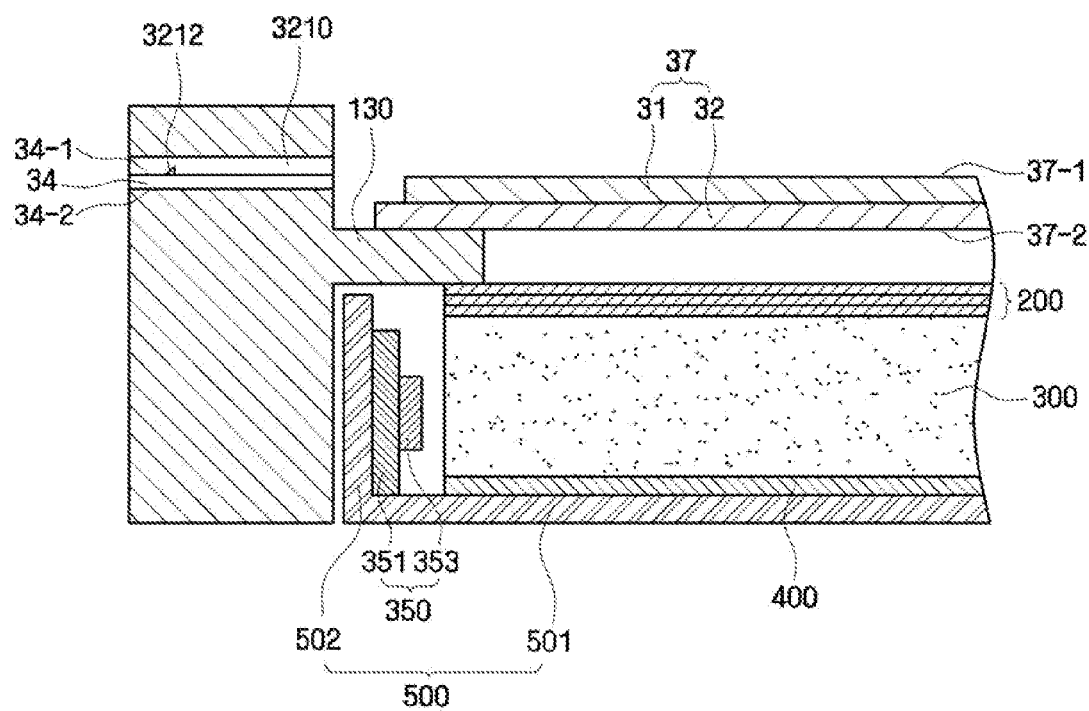
FIG. 19 illustrates a cross-sectional view taken along line III-III' of a modified embodiment of FIG. 14.

Next, a liquid crystal display according to still another exemplary embodiment of the present invention will be described in detail with reference to FIGS. 14 through 19. FIG. 14 illustrates an exploded perspective view of a third exemplary embodiment of a liquid crystal display (LCD) according to the present invention, FIG. 15 illustrates a circuit board mounting portion of the LCD shown in FIG. 14, FIG. 16 illustrates a cross-sectional view taken along the line IV-IV' of FIG. 15, FIG. 17 illustrates a cross-sectional view taken along line III-III' of FIG. 14, FIG. 18 illustrates a cross-sectional view taken along line IV-IV' of a modified embodiment of FIG. 15, and FIG. 19 illustrates a cross-sectional view taken along the line III-III' of a modified embodiment of FIG. 14. For brevity, in the embodiments that follow, components having substantially the same function as the exemplary embodiment shown in FIGS. 1 through 8 are identified by the same reference numerals, and detailed descriptions thereof will be omitted or abbreviated.

Referring to FIG. 14, the intermediate receiving container 100 of the LCD 3 according to still another exemplary embodiment of the present invention includes a frame 120 and a printed circuit board mounting portion 3000 positioned at one sidewall 121 of the frame 120.

Referring to FIGS. 14 and 15, the printed circuit board mounting portion 3000 includes a sidewall 121 that is partially cut out to form a recessed portion in the frame 120. The printed circuit board mounting portion 3000 includes a printed circuit board supporting portion 3100 on which the printed circuit board 34 is mounted, and mounting portion sidewalls 3200 and 3300 at the two ends of the recessed portion.

Referring to FIGS. 15 and 16, the sidewalls 3200 and 3300 include grooves 3210 and 3310 that extend across the width of the sidewall 121 of the frame 120 and into which the printed circuit board 34 is slidably inserted. The grooves 3210 and 3310 may be formed to penetrate through the one sidewall 121 of the frame 120. A length L3 of each of the grooves 3210 and 3310 may be substantially equal to a width ('W1' of FIG. 5B) of one side of the printed circuit board 34 to be inserted into the grooves 3210 and 3310. First and second ends of the printed circuit board 34 are slidably inserted into the grooves 3210 and 3310 and rest on the printed circuit board supporting portion 3100.

In the present embodiment, when the printed circuit board 34 is mounted on the printed circuit board mounting portion 3000, the printed circuit board 34 and the liquid crystal panel 37 may be substantially coplanar with respect to each other. Accordingly, in the present embodiment, the flexible printed circuit board 35 may not be bent or bent only minimally, thereby reducing a required length of the flexible printed circuit board 35.

Referring to FIGS. 14 and 17, in the LCD 3 of the present embodiment, the printed circuit board 34 connected to the liquid crystal panel 37 is mounted on the printed circuit board mounting portion 3000 of the intermediate receiving container 110.

According to the present embodiment, the printed circuit board 34 may be disposed at one side of the liquid crystal panel 37. Here, first and second ends of the printed circuit board 34 are slidably inserted into the grooves 3210 and 3310 of the sidewalls 3200 and 3300, so that a rear surface 34-2 of the printed circuit board 34 rests on the printed circuit board supporting portion 3100. In addition, a front surface 34-1 of the printed circuit board 34 may be disposed to face the same direction as a first surface 37-1 of the liquid crystal panel 37.

Referring to FIGS. 18 and 19, the printed circuit board mounting portion 3000 may include a securing portion 3212 formed on a sliding plane 3211 of the grooves 3210 and 3310 of the sidewalls 3200 and 3300. The securing portion 3212 may be shaped of a protrusion protruding from the sliding plane 3211 of the grooves 3210 and 3310 of the sidewalls 3200 and 3300. As described above, the securing portion 3212 may be received in a receiving part (e.g., 38 of FIG. 7) formed at one edge of the printed circuit board 34. Accordingly, the printed circuit board 34 is slidably inserted into the grooves 3210 and 3310 of the sidewalls 3200 and 3300 to then be tightly fixed. Therefore, when the printed circuit board 34 is mounted on the printed circuit board mounting portion 3000, a fastening force between the printed circuit board 34 and the grooves 3210 and 3310 may be increased.

Meanwhile, the securing portion 3212 may be a hook, and the receiving part (e.g., 38 of FIG. 7) may be a coupling hole (e.g., 38 of FIG. 7) penetrating through one edge of the printed circuit board 34. The hook may extend through the coupling hole, thereby establishing a connection between the securing portion 3212 and the receiving part (38 of FIG. 7).

While the present invention has been particularly shown and described with reference to exemplary embodiments thereof, it will be understood by those of ordinary skill in the art that various changes in form and details may be made therein without departing from the spirit and scope of the present invention as defined by the following claims. It is therefore desired that the present embodiments be considered in all respects as illustrative and not restrictive, reference being made to the appended claims rather than the foregoing description.

What is claimed is:

1. A liquid crystal display comprising:
   a liquid crystal panel having a first surface on which an image is displayed and a second surface opposite the first surface;
   a printed circuit board connected to the liquid crystal panel and having a front surface and a rear surface; and
   an intermediate receiving container including a frame and a printed circuit board mounting portion positioned on a sidewall of the frame,
   wherein the printed circuit board is mounted on the printed circuit board mounting portion such that the front surface of the printed circuit board and the first surface of the liquid crystal panel face the same direction.

2. The liquid crystal display of claim 1, wherein a slide rail includes a protrusion protruding from the sidewall of the frame to an edge of the liquid crystal panel, and a groove which is formed at one side of the protrusion to receive the printed circuit board.

3. The liquid crystal display of claim 2, wherein the groove extends from one sidewall of the frame to a distal end of the protrusion.

4. The liquid crystal display of claim 3, wherein a length of the groove is substantially equal to a width of the printed circuit board.

5. The liquid crystal display of claim 2, wherein the slide rail further includes a securing portion formed on a sliding plane of the groove, and the printed circuit board includes a receiving part for coupling to the securing portion.

6. The liquid crystal display of claim 5, wherein the securing portion is a hook, and the receiving part is a coupling hole.

7. The liquid crystal display of claim 1, wherein the printed circuit board mounting portion is formed to mount the printed circuit board and further includes a printed circuit board supporting portion protruding from the sidewall of the frame.

8. The liquid crystal display of claim 7, wherein a slide rail includes an upright portion protruding from one plane of the printed circuit board supporting portion, and a parallel portion extending from the upright portion and parallel with a first surface of the printed circuit board supporting portion.

9. The liquid crystal display of claim 8, wherein the printed circuit board further includes a stopper protruding from the one sidewall of the frame.

10. The liquid crystal display of claim 9, wherein the stopper includes a slanted surface that inclines downward with distance from the sidewall of the frame, and a bottom portion extending between an end of the slanted surface and the sidewall.

11. The liquid crystal display of claim 9, wherein a gap between the stopper and the printed circuit board supporting portion is substantially equal to a thickness of the printed circuit board.

12. The liquid crystal display of claim 9, wherein a first end of the printed circuit board is inserted into the slide rail and a second end of the printed circuit board is interposed between the printed circuit board supporting portion and the stopper.

13. The liquid crystal display of claim 7, wherein the printed circuit board supporting portion includes an opening to facilitate heat dissipation of the printed circuit board.

14. A liquid crystal display comprising:
   a liquid crystal panel;
   a printed circuit board connected to the liquid crystal panel; and an intermediate receiving container including a frame and a printed circuit board mounting portion formed on a sidewall of the frame, wherein the printed circuit board is mounted on the printed circuit board mounting portion, and wherein the printed circuit board and the liquid crystal panel are disposed so as not to overlap each other.

15. The liquid crystal display of claim 14, wherein the printed circuit board mounting portion includes a recessed portion and a mounting portion sidewall.

16. The liquid crystal display of claim 15, wherein the sidewall includes a groove configured to receive the printed circuit board.

17. The liquid crystal display of claim 16, wherein a length of the groove is substantially equal to a width of the printed circuit board.

18. The liquid crystal display of claim 16, wherein the printed circuit board mounting portion further includes a securing portion formed on a sliding plane of the groove, and the printed circuit board mounting portion includes a receiving part for receiving the securing portion.

19. The liquid crystal display of claim 18, wherein the securing portion is a hook, and the receiving part is a coupling hole.

20. A liquid crystal display comprising:
a liquid crystal panel;
a printed circuit board connected to the liquid crystal panel; and
a receiving container including a frame and a mounting portion positioned on a sidewall of the frame,
wherein the printed circuit board is mounted on the mounting portion.

21. The liquid crystal display of claim 20, wherein the liquid crystal panel has a first surface on which an image is displayed and a second surface opposite the first surface,
the printed circuit board has a front surface and a rear surface, and
the front surface of the printed circuit board and the first surface of the liquid crystal panel face the same direction.

22. The liquid crystal display of claim 20, wherein the mounting portion comprises a slide rail,
wherein the slide rail includes a protrusion protruding from the sidewall of the frame to an edge of the liquid crystal panel, and a groove which is formed at one side of the protrusion to receive the printed circuit board.

23. The liquid crystal display of claim 20, wherein the mounting portion includes a printed circuit board supporting portion protruding from the sidewall of the frame.

* * * * *